W. HARTILL-LAW.
BRAKE MECHANISM FOR CARS.
APPLICATION FILED NOV. 23, 1916.

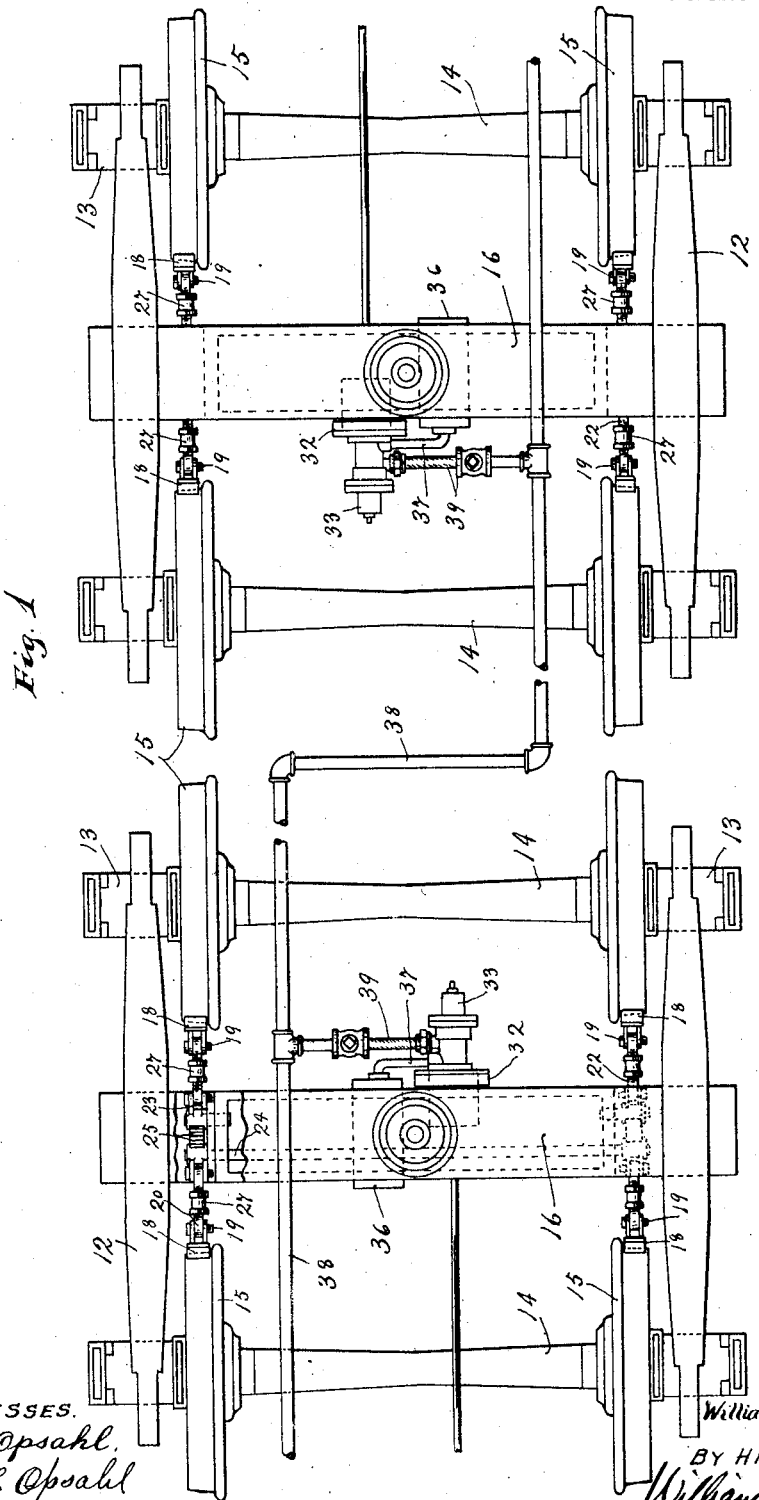

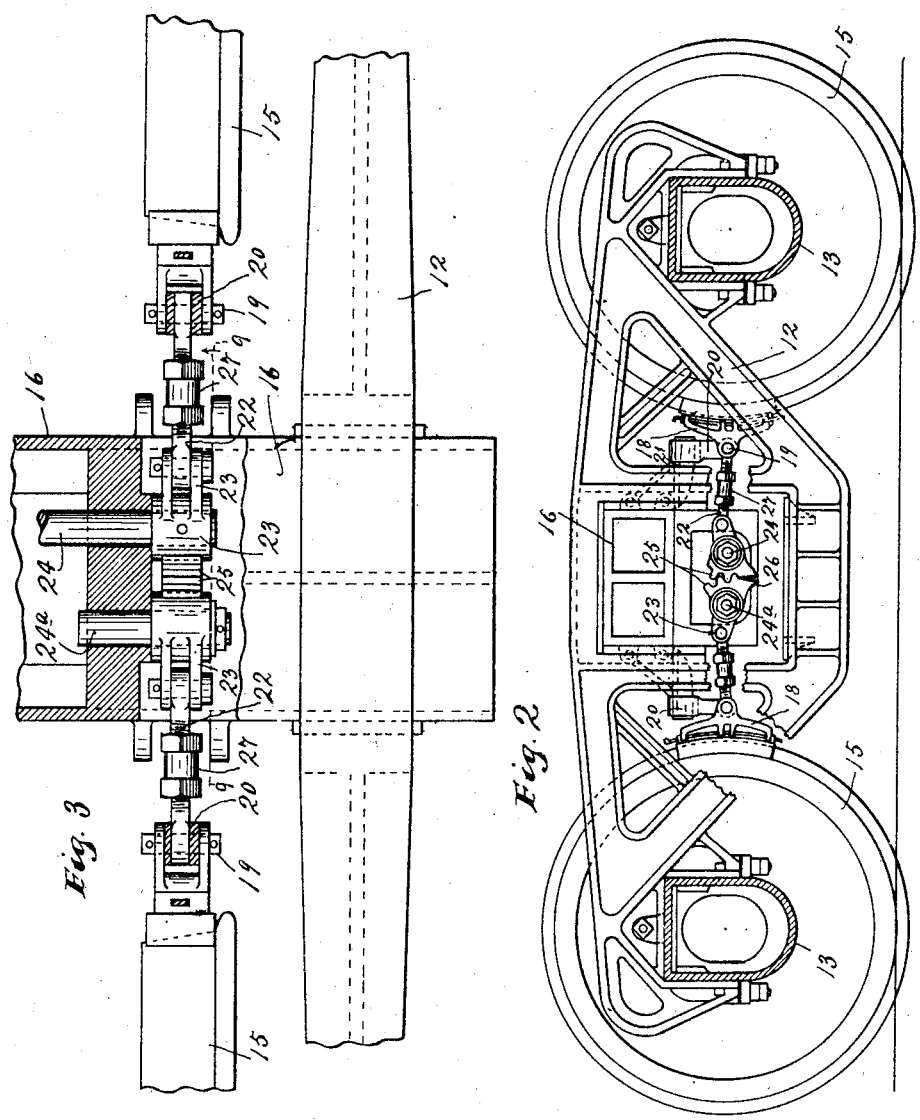

1,344,129.

Patented June 22, 1920.
6 SHEETS—SHEET 3.

WITNESSES.
H. L. Opsahl.
A. H. Opsahl

INVENTOR.
William Hartill-Law.

BY HIS ATTORNEYS.
Williamson Merchant

W. HARTILL-LAW.
BRAKE MECHANISM FOR CARS.
APPLICATION FILED NOV. 23, 1916.

1,344,129.
Patented June 22, 1920.
6 SHEETS—SHEET 4.

WITNESSES.
H. L. Opsahl.
A. H. Opsahl.

INVENTOR.
William Hartill-Law.
BY HIS ATTORNEYS

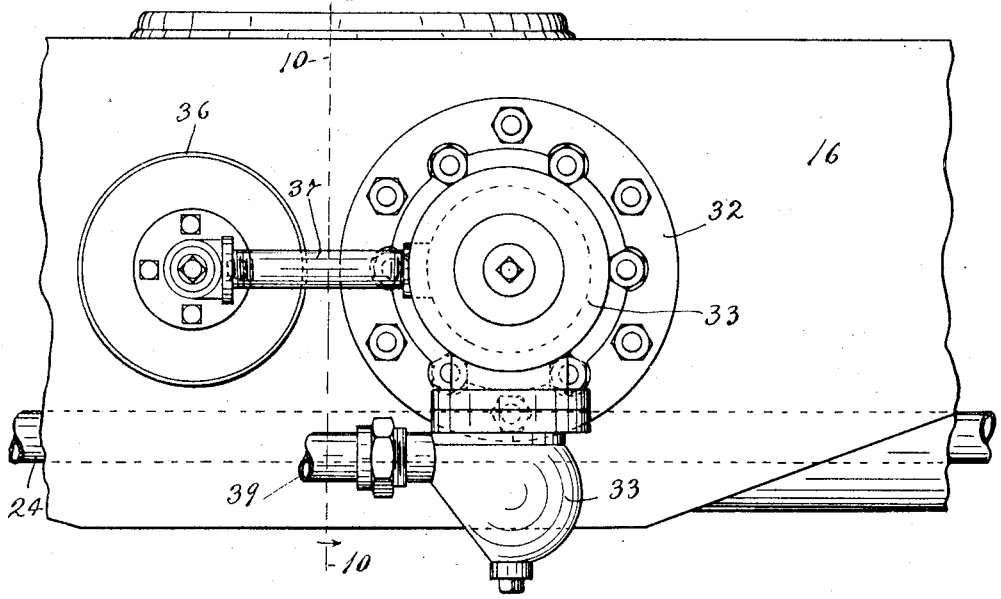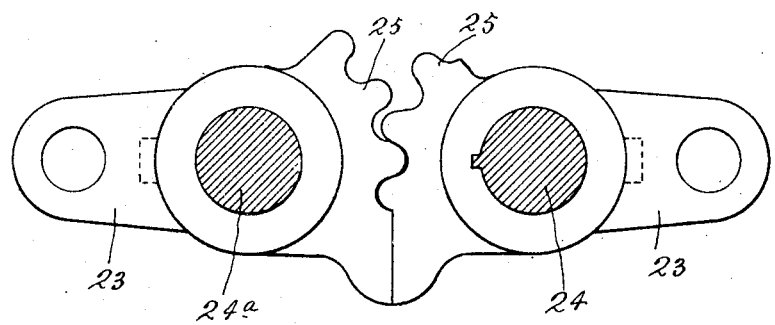

W. HARTILL-LAW.
BRAKE MECHANISM FOR CARS.
APPLICATION FILED NOV. 23, 1916.
1,344,129.
Patented June 22, 1920.
6 SHEETS—SHEET 6.
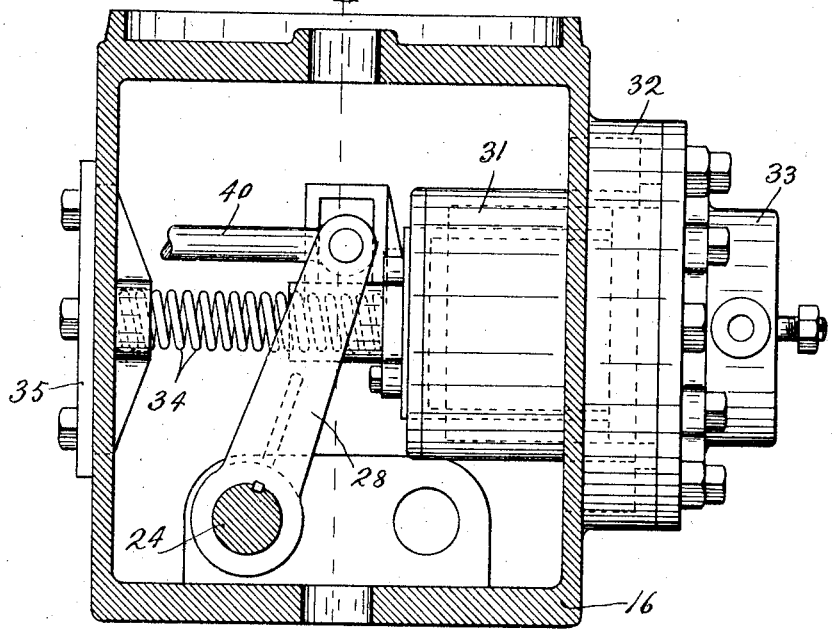
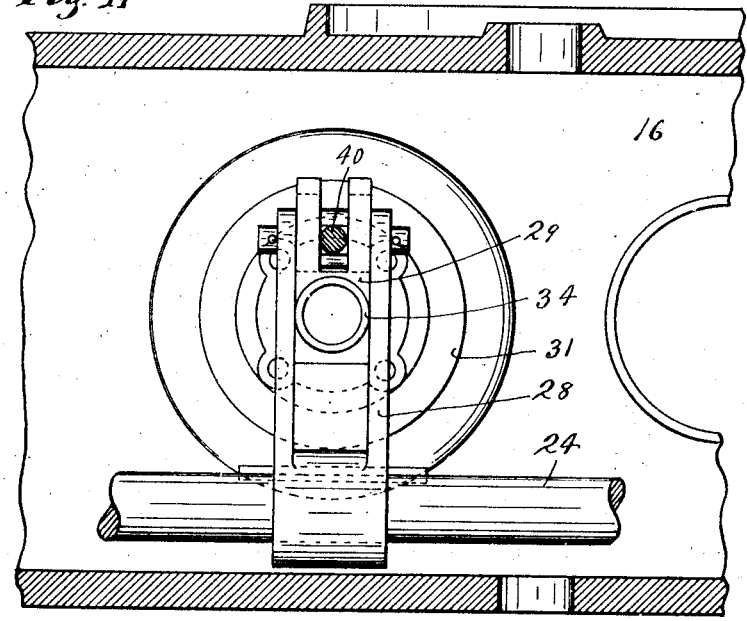
WITNESSES.
H. L. Opsahl.
A. H. Opsahl.
INVENTOR.
William Hartill-Law.
BY HIS ATTORNEYS.

UNITED STATES PATENT OFFICE.

WILLIAM HARTILL-LAW, OF MINNEAPOLIS, MINNESOTA, ASSIGNOR TO BEAMLESS CAR TRUCK SELF-ADJUSTING BRAKE COMPANY, OF MINNEAPOLIS, MINNESOTA, A CORPORATION OF MINNESOTA.

BRAKE MECHANISM FOR CARS.

1,344,129.      Specification of Letters Patent.      Patented June 22, 1920.

Application filed November 23, 1916. Serial No. 132,982.

*To all whom it may concern:*

Be it known that I, WILLIAM HARTILL-LAW, a citizen of the United States, residing at Minneapolis, in the county of Hennepin and State of Minnesota, have invented certain new and useful Improvements in Brake Mechanism for Cars; and I do hereby declare the following to be a full, clear, and exact description of the invention, such as will enable others skilled in the art to which it appertains to make and use the same.

My invention relates to car trucks and has for its object to improve the construction and operation of the brake mechanism thereof. Certain of the features of the invention relate especially to air brake apparatus, but other features, while especially adapted for use with air brake mechanism, are, nevertheless, capable of more general use and will be found serviceable even with brake mechanism operated by hand power.

In the preferred embodiment of the invention, each truck will have its own independent brake mechanism, but in general practice, the two trucks of the same car will operate in unison, and in unison, or substantially so with the brake mechanisms of the various trucks throughout the train. As its salient feature, the invention involves first means, whereby, under varying load and resulting varying depression of the car body, the brake power applied to the brake shoes will be correspondingly varied. This feature, in its best embodiment, involves shoe-acting toggle connections, which, as well as the brake shoes, are carried by and moved vertically with the truck bolster, or other suitable part that partakes of the vertical movement of the car body. In the standard brake mechanism now in general use, the air brakes are arranged to set the brake shoes with a maximum pressure that is constant, that is, does not vary with the load, and which force is intended not to be sufficient to slide the wheels of the car even when the car is empty. With such an arrangement, it results that when the car is loaded, and hence, its momentum is increased, the brakes do not set as hard as they could safely be set without sliding the wheels, and the result is that a loaded train cannot be brought to a stop nearly as quickly as an unloaded train.

The above first noted feature of my invention makes it possible to stop a loaded train substantially as quick as an unloaded train, and within substantially the same distance of travel without sliding and flattening the wheels. The second general feature of the invention is directed to an improved arrangement of the brake cylinders and auxiliary reservoirs, whereby they are carried by the truck bolster and incorporated as substantially parts thereof.

In the accompanying drawings which illustrate the invention, like characters indicate like parts throughout the several views.

Referring to the drawings:

Figure 1 is a plan view with some parts broken away, showing the two trucks of a car and illustrating my invention as applied thereto;

Fig. 2 is a side elevation of one of the trucks of the car, some parts being broken away and with some parts being sectioned;

Fig. 3 is a fragmentary view partly in plan showing one side of the truck and illustrating the toggle connections of the brake actuating mechanism;

Fig. 8 is an elevation showing the central portion of the truck bolster and the brake cylinder, triple valve and auxiliary reservoir;

Fig. 9 is a detail taken in section approximately on the line 9—9 of Fig. 3, some parts being removed;

Fig. 10 is a section taken on the line 10—10 of Fig. 8; and

Fig. 11 is a section taken on the line 11—11 of Fig. 10.

Figure 4:
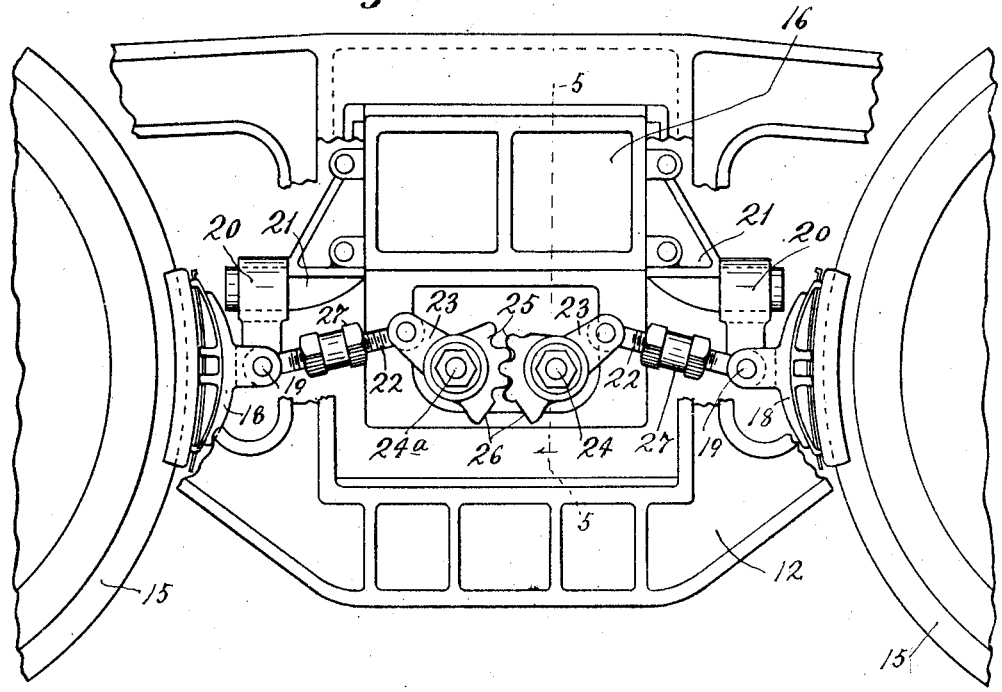
Fig. 4 is a fragmentary side elevation showing part of the truck and the toggle connections of the brake mechanism.
Figure 5:
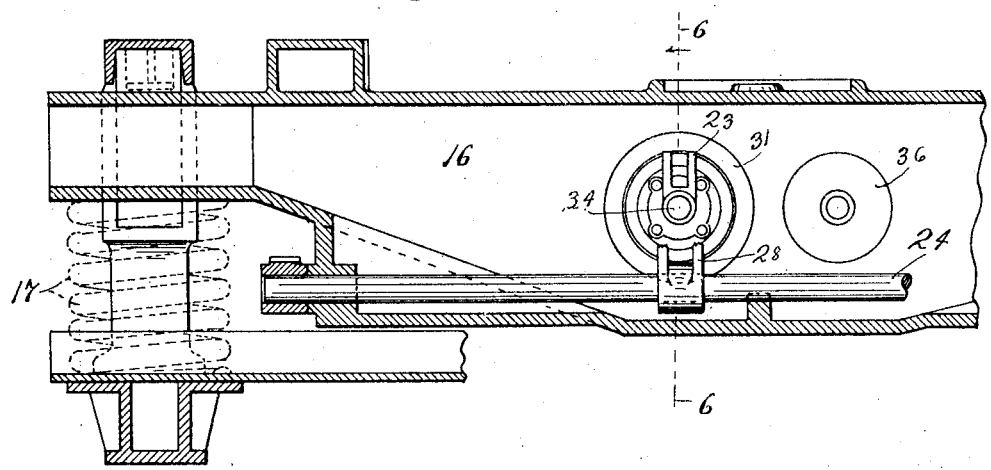
Fig. 5 is a section taken approximately on the line 5—5 of Fig. 4.

In Fig. 1, both of the trucks of a car are shown, but the body of the car is removed. Of the parts of the trucks, it is for the purposes of this case necessary only to particularly note the truck side frames 12, journal boxes 13, axles 14, wheels 15 and truck bolster 16, which latter is supported from the truck side frames, by springs 17 of the usual or any suitable arrangement. The truck bolster, of course, as is usual, will move vertically with the car body, and hence, its altitude will be varied by the varying load carried by the car body. This bolster may vary in construction, but as shown, it is cast hollow and is of the so-called "fish belly" type, being rectangular in cross section.

Hitherto it has been the practice to hang the brake shoes from the truck side frames, and in such manner that the shoes were not given vertical movement under varying depressions of the car body due to different loads. In accordance with my invention, however, I hang the brake shoes on projections or supports carried by and movable vertically with the truck bolster, so that the brake shoes will be given a depression corresponding to the depression given to the car body and, consequently, varying with the load. If then, these brake shoes be normally set with their centers at or a little below a horizontal line intersecting the axis of the truck wheels, it is evident that they will be moved farther and farther downward by increasing load in the car body. With this arrangement it will follow that two brake shoes arranged to engage the opposing inner faces of adjacent front and rear wheels of a truck, must be moved farther apart, in the brake setting action, when they are lower than when they are at points higher up. This fact, and the use of shoe actuating toggles having relatively fixed or local pivots carried by the bolster, are utilized to obtain a brake setting action that will increase with increasing load and decrease with decreasing load, or, in other words, which will vary approximately with the load.

The brake shoes 18, which are preferably of the standard M. C. B. type, are, as shown, pivotally connected by heavy pins 19 to the depending prongs of shoe hangers 20 that are mounted to slide horizontally on the projecting horizontal end portions of cantaliver arms 21 that are either cast integral with or otherwise, rigidly secured to the opposite sides of the truck bolster 16. These hangers 20, as will be seen, support the brake shoes for horizontal setting and releasing movements without moving the same vertically in respect to the truck bolster or car body, and this is important, because the only vertical movement imparted to the brake shoes must be due to varying load. The shoe actuating toggles are made up of links 22 and crank arms 23. As shown, the right hand crank arms 23 are rigidly secured to the projecting ends of a rock shaft 24 that is journaled in the lower portion of the truck bolster 16, while the left hand crank arms 23 are pivoted on studs or stub shafts 24ª that are rigidly secured to said bolster. The coöperating crank arms 23 are connected for reverse synchronous movements by gear segments 25 shown as cast integral therewith. The coöperating arms 23 and links 22 are pivotally connected to the outer ends of the latter and are also pivotally connected to the brake shoes by the heretofore noted pivot pins 19. The gear segments 25 have stop surfaces 26 that limit the reverse downward movements of the crank arms 23, and hence, limit the extreme approach of the toggles to dead centers. The links 22 are made longitudinally adjustable by turn buckles or sleeves 27 that have right and left threaded engagement with the sections of the said links.

The rock shaft 24, at its central portion, and within the hollow truck bolster is provided with a heavy crank arm or lever 28 that is connected by a cross head 29 to a piston 30 of the brake cylinder 31 of the air brake system.

Figure 6:
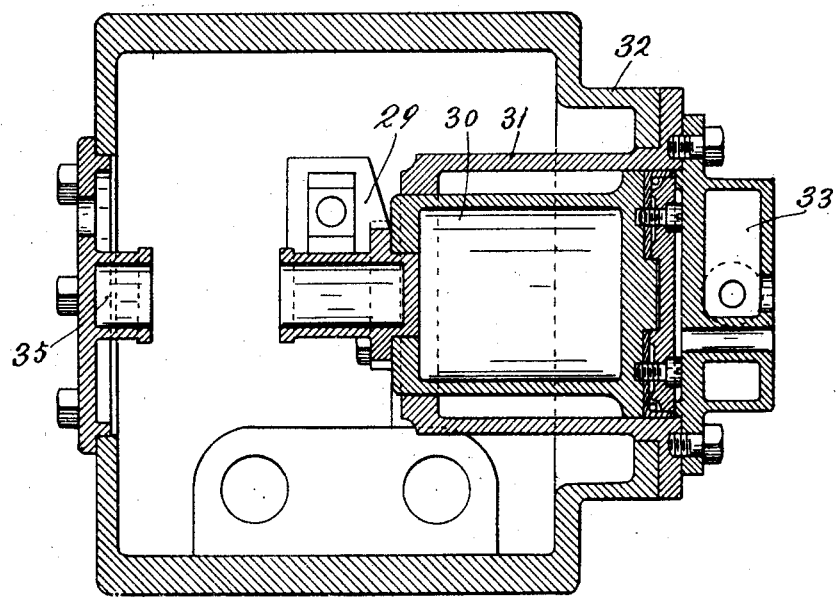
Fig. 6 is an enlarged section taken on the line 6—6 of Fig. 5, with some parts removed.
Figure 7:
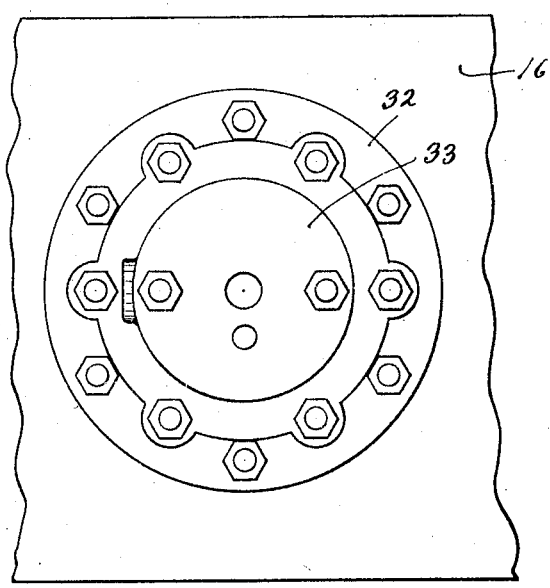
Fig. 7 is a front elevation of the parts shown in Fig. 6.

As a feature of this invention, the brake cylinder 31 is applied to and carried by the truck bolster, and to such end, the latter is shown as provided with a large boss 32 to which the flange of said cylinder and the triple valve mechanism are bolted, or otherwise rigidly secured. The said triple valve mechanism, which may be of the usual type, is indicated, as an entirety, by the numeral 33. The piston member 30 is yieldingly retracted and held in normal position by a coiled spring 34 compressed between the same and a plate 35 that is detachably applied to the opposite side of the bolster (see particularly Figs. 6 and 10).

As another feature of the invention, the auxiliary reservoir 36 is extended through and rigidly secured to the bolster. The auxiliary reservoirs are connected to the brake motor through the triple valve mechanism, by short pipes 37 and the said triple valves are connected to the train pipe 38 by valve-equipped pipes 39. Inasmuch as the train pipe 38 will be carried by the car body, the pipes 39 should have flexible sections, such as rubber hose, to permit the free vertical movements of the truck bolster and triple valve ends of the said branch pipes.

The numeral 40 indicates a hand brake rod which extends through a suitable opening in the bolster and is pivoted to the upper end of the rock shaft lever 28. Any standard hand brake system may be used.

With the above described arrangement, it is evident that the auxiliary reservoir, brake motor, brake actuating connections and shoes, all partake of the common vertical movements of the car body and bolster, due to the varying load.

Fig. 4 shows the brakes set when the bolster is at its greatest altitude and which is when the car is without load other than its own weight and in which position a horizontal line drawn through the centers of the brake shoes and through the outer pivots of the toggles, will be but slightly below the axis of the truck wheels. When, however, the truck bolster is forced farther downward by increasing load on the car body, the shoes will be in position for engagement lower down on the truck wheels and hence, will require greater separation in the brake setting action, or in other words, the toggles in setting the brake shoes against the wheels, will, under increasing load, require movements nearer and nearer to the dead centers, and, as is well understood, the power of these toggles, when operated by constant piston pressure, will become greater and greater as these toggles approach their dead centers.

In the brake setting and releasing actions, the upper portions of the hinges 20 slide upon the cantaliver arms 21. The wear of the brake shoes is compensated for by adjustments of the toggle links 27, it being, of course, understood that the said links will necessarily be increased in length as the shoes wear away.

In addition to its simple and powerful movement, this system of brake-gear has a distinct and specific advantage not possessed by any other system, because the braking force increases automatically as the load is increased, and through this fact, the time consumed in stopping the train will be reduced one half or more, while air need not be applied so early, or for so long a time before stops. Moreover, steam may be cut off earlier, resulting in a saving of steam, water, and coal consumption at each stoppage.

These trucks do not entail any radical change in the construction or operation of any standard "quick action automatic brake equipment." I simply transfer the air cylinder and auxiliary reservoir (hitherto suspended under the car body) to the truck bolsters, using a wholly different plan for applying the brake power, and while making each truck system independent of the other, in general practice, they will act in unison.

Each truck has a branch pipe from the brake pipe coupled to the triple-valve with a flexible hose to allow free action of the truck when swinging on curves, etc., this also providing for the deflection of the bolster, strainer or dirt collector and cut-out cock. Should it be necessary for any reason to shut off the air from any one triple valve, only one half the brake power of the car will be cut off, the other truck brake system will remain in action. Under present methods, which use but one triple valve and air system, the brake power of the whole car is of no avail when the cut-out cock is closed. This latter also adversely effects the emergency application of the brakes throughout the train.

It is important to note that in the above described arrangement, the re-action of the force which is applied to the brake is dissipated in the truck frame mechanism, and hence, does not tend to lift the truck bolster or the load, to wit, the car body, supported from said bolster.

What I claim is:

1. The combination with a car truck, of brake mechanism including brake shoes and shoe-actuating devices, said shoe-actuating devices including automatic means for increasing the brake setting power with increasing load, the ultimate operating means being in the truck structure and the reacting force in the brake setting action being absorbed in the truck structure so that it does not tend to lift the load.

2. The combination with a car truck, of brake mechanism including brake shoes, shoe actuating toggles and toggle actuating connections automatically adjustable for increasing the braking power under increasing load the ultimate operating means being in the truck-structure and the re-acting force in the brake-setting action being absorbed in the truck-structure, so that it does not tend to lift the load.

3. The combination with a car truck, of brake mechanism including brake shoes, shoe actuating toggles and toggle actuating connections automatically adjustable for increasing the braking power under increasing load, the ultimate operating means being in the truck-structure and the re-acting force in the brake-setting action being absorbed in the truck-structure, so that it does not tend to lift the load and means for adjusting the toggles to compensate for wear of the brake shoes.

4. The combination with a car truck, of brake mechanism including brake shoes, shoe actuating toggles and toggle actuating connections automatically adjustable for increasing the braking power under increasing load, the said toggles being arranged in reversely thrusting pairs on both sides of the truck the ultimate operating means being in the truck-structure and the re-acting force in the brake-setting action being absorbed in the truck-structure, so that it does not tend to lift the load.

5. The combination with a car truck having a spring supported bolster, of brake shoes and shoe actuating toggles carried by and vertically movable with the said bolster and arranged for increasing brake setting power, under increasing load and resulting depression of said bolster.

6. The combination with a car truck having a spring supported bolster, of brake shoes and shoe actuating toggles carried by and vertically movable with the said bolster and arranged for increasing brake setting power, under increasing load and resulting depression of said bolster, the said toggles being arranged in reversely thrusting pairs on opposite sides of the truck and connected for synchronous brake setting and releasing movements.

7. The combination with a car truck having a spring supported bolster, of brake shoes and shoe actuating toggles carried by and vertically movable with the said bolster and arranged for increasing brake setting power, under increasing load and resulting depression of said bolster, an air brake motor carried by said bolster and having connections for operating said toggles.

8. The combination with a car truck having a spring-supported bolster, of cantaliver arms projecting horizontally from both sides of said bolster, shoe hangers mounted to slide horizontally on said cantaliver arms brake shoes carried by said hangers and movable to and from engagement with the opposing faces of alined truck wheels, toggles comprising crank arms and links, the latter being connected to said shoes, and the former being journaled to said bolster and connected for synchronous movements by intermeshing gear segments, and power means for oscillating said toggles.

9. The combination with a car truck having a spring-supported bolster, of cantaliver arms projecting horizontally from both sides of said bolster, shoe hangers mounted to slide horizontally on said cantaliver arms, brake shoes carried by said hangers and movable to and from engagement with the opposing faces of alined truck wheels, toggles comprising crank arms and links, the latter being connected to said shoes, and the former being journaled to said bolster and connected for synchronous movements by intermeshing gear segments having stops limiting the movements of said toggle toward dead centers, and power means for oscillating said toggles.

10. The combination with a car truck having a spring supported bolster, of cantaliver arms projecting horizontally from both sides of said bolster, shoe hangers mounted to slide horizontally on said cantaliver arms, brake shoes carried by said hangers and movable to and from engagement with the opposing faces of alined truck wheels, toggles comprising crank arms and links, the latter being connected to said shoes, and the former being journaled to said bolster and connected for synchronous movements by intermeshing gear segments, and power means for oscillating said toggles, the said toggle links being longitudinally adjustable to compensate for wear of the shoes.

11. The combination with a car truck having a spring supported bolster, of cantaliver arms projecting horizontally from both sides of said bolster, shoe hangers mounted to slide horizontally on said cantaliver arms, brake shoes carried by said hangers and movable to and from engagement with the opposing faces of alined truck wheels, toggles comprising crank arms and links, the latter being connected to said shoes, and the former being journaled to said bolster and connected for synchronous movements by intermeshing gear segments, power means for oscillating said toggles, a rock shaft secured to the opposite parallel crank arms of said toggles and journaled in said bolster, said bolster being hollow and said rock shaft having an arm within said bolster, and an air brake motor mounted on said bolster and having its movable element connected to said arm for oscillating said rock shaft.

12. The combination with a car truck having a spring-supported bolster, of cantaliver arms projecting horizontally from both sides of said bolster, shoe hangers mounted to slide horizontally on said cantaliver arms, brake shoes carried by said hangers and movable to and from engagement with the opposing faces of alined truck wheels, toggles comprising crank arms and links, the latter being connected to said shoes, and the former being journaled to said bolster and connected for synchronous movements by intermeshing gear segments, power means for oscillating said toggles, a rock shaft secured to the opposite parallel crank arms of said toggles and journaled in said bolster, said bolster being hollow and said rock shaft having an arm within said bolster, and an air brake motor mounted on said bolster and having its movable element connected to said arm for oscillating said rock shaft in one direction, and a spring for imparting the other movement to the said movable member.

In testimony whereof I affix my signature in presence of two witnesses.

WILLIAM HARTILL-LAW.

Witnesses:
CLARA DEMAREST,
F. D. MERCHANT.